United States Patent [19]

Bueschges et al.

[11] Patent Number: 5,143,882
[45] Date of Patent: Sep. 1, 1992

[54] TRANSITION-METAL CATALYST COMPONENT FOR A ZIEGLER CATALYST SYSTEM, AND THE USE OF SAID SYSTEM

[75] Inventors: Ulrich Bueschges, Mannheim; Roland Saive, Ludwigshafen, both of Fed. Rep. of Germany

[73] Assignee: BASF Aktiengesellschaft, Ludwigshafen, Fed. Rep. of Germany

[21] Appl. No.: 667,119

[22] Filed: Mar. 11, 1991

[30] Foreign Application Priority Data

Mar. 19, 1990 [DE] Fed. Rep. of Germany ....... 4008735

[51] Int. Cl.$^5$ .............................................. C08F 4/685
[52] U.S. Cl. .................................... 502/113; 502/120; 502/125; 502/127; 526/116
[58] Field of Search ................ 502/113, 125, 127, 120

[56] References Cited

U.S. PATENT DOCUMENTS

| | | | |
|---|---|---|---|
| 3,242,150 | 3/1966 | Scoggin | 260/88.2 |
| 3,377,352 | 4/1968 | Clark | 260/286 |
| 3,444,149 | 5/1969 | Kelly | 260/80.78 |
| 3,462,399 | 8/1969 | Matthews | 260/80.78 |
| 4,302,566 | 11/1981 | Karol | 526/125 |
| 4,487,845 | 12/1984 | Triplett | 502/125 X |
| 4,579,919 | 4/1986 | Staiger et al. | 502/125 X |
| 4,581,426 | 4/1986 | Asanuma et al. | 502/125 X |
| 4,710,552 | 12/1987 | Bachl et al. | 502/113 X |
| 4,739,015 | 4/1988 | Toyota et al. | 525/270 |
| 4,814,314 | 3/1989 | Matsuura et al. | 502/127 X |
| 4,831,090 | 5/1989 | Bachl et al. | 502/113 X |

FOREIGN PATENT DOCUMENTS

| | | |
|---|---|---|
| 0004645 | 12/1984 | European Pat. Off. . |
| 0179303 | 4/1986 | European Pat. Off. . |
| 0264090 | 4/1988 | European Pat. Off. . |
| 0166888 | 6/1988 | European Pat. Off. . |
| 1745519 | 8/1972 | Fed. Rep. of Germany . |
| 3239883 | 5/1984 | Fed. Rep. of Germany . |

*Primary Examiner*—Patrick P. Garvin
*Attorney, Agent, or Firm*—Keil & Weinkauf

[57] ABSTRACT

A transition-metal catalyst component for a Ziegler catalyst system, obtainable by 1) mixing, in a solvent, an inorganic, oxidic carrier with
   1.1) a vanadium trihalide/alcohol complex of the formula $VY_3nZ\text{-}OH$, where
      Y is chlorine or bromine,
      N is from 1 to 6, and
      Z is a monovalent, saturated, aliphatic or araliphatic hydrocarbon radical having not more than 10 carbon atoms, and
   1.2) a titanium trihalide or a titanium trihalide/aluminum trihalide complex, where the halogen can be chlorine and/or bromine, or a titanium trihalide complex of the formula $TiY_3 \cdot nZ\text{-}OH$ or a mixture thereof, where
      Y is chlorine or bromine,
      n is from 1 to 6, and
      Z is a monovalent, saturated, aliphatic or araliphatic hydrocarbon radical having not more than 10 carbon atoms or a mixture thereof, and
   1.3) a zirconium tetrahalide, where the halogen can be chlorine and/or bromine,
2) removing the solvent by evaporation,
3) mixing the solid-phase intermediate from step (2) with
   3.1) an organoaluminum catalyst component of the formula $AlR_mX_{3-m}$, where
      R is a $C_1$- to $C_{18}$- hydrocarbon radical,
      m is from 1 to 3, and
      X is OR, chlorine, bromine or hydrogen, and
   3.2) an organic carboxylate or an organosilicon compound or a mixture thereof in an organic solvent, and
4) if desired, isolating the solid-phase intermediate by filtration, washing and drying.

and the use thereof for the homopolymerization or copolymerization of ethane are described.

10 Claims, No Drawings

TRANSITION-METAL CATALYST COMPONENT FOR A ZIEGLER CATALYST SYSTEM, AND THE USE OF SAID SYSTEM

The present invention relates to a transition-metal catalyst component for a Ziegler catalyst system, obtainable by 1) mixing, in a solvent, an inorganic, oxidic carrier with
   1.1) a vanadium trihalide/alcohol complex of the formula $VY_3nZ$—OH, where
      Y is chlorine or bromine,
      n is from 1 to 6, and
      Z is a monovalent, saturated, aliphatic or araliphatic hydrocarbon radical having not more than 10 carbon atoms, and
   1.2) a titanium trihalide or a titanium trihalide/aluminum trihalide complex, where the halogen can be chlorine and/or bromine, or a titanium trihalide complex of the formula $TiY_3.nZ$-OH or a mixture thereof, where
      Y is chlorine or bromine,
      n is from 1 to 6, and
      Z is a monovalent, saturated, aliphatic or araliphatic hydrocarbon radical having not more than 10 carbon atoms or a mixture thereof, and
   1.3) a zirconium tetrahalide, where the halogen can be chlorine and/or bromine,
2) removing the solvent by evaporation,
3) mixing the solid-phase intermediate from step (2) with
   3.1) an organoaluminum catalyst component of the formula $AlR_mX_{3-m}$, where
      R is a $C_1$-to $C_{18}$-hydrocarbon radical,
      m is from 1 to 3, and
      X is OR, chlorine, bromine or hydrogen, and
   3.2) an organic carboxylate or an organosilicon compound or a mixture thereof in an organic solvent, and
4) if desired, isolating the solid-phase intermediate by filtration, washing and drying.

The present invention furthermore relates to the use of this catalyst component in a Ziegler catalyst system for preparing a homopolymer of ethene or a copolymer of ethene with minor amounts of a $C_3$- to $C_8$-, in particular $C_4$- to $C_6$-α-monoolefin by polymerizing the monomers at from 30 to 200° C., preferably from 50 to 100° C., and at from 1 to 200 bar.

Polymerization processes of this type are known and have been described, for example, in EP-A 0 166 888. The transition-metal catalyst component (1) published therein, which is obtainable from a transition-metal starting component (2b), comprising a mixture of a vanadium component and a titanium component and, if desired, a zirconium tetrahalide, allows homopolymers and copolymers of ethene to be prepared with a specific, very broad molecular weight distribution and with good productivity and grain quality of the products. However, for specific objectives, such as the preparation of high-molecular-weight, high density products, the productivity of the system and the grain quality of the resultant polymers are still inadequate. In addition, the resistance to environmental stress cracking, the bubble stability on film blowing and the mechanical strength of the resultant films are also in need of improvement. It is also necessary to reduce the hydrocarbon-soluble components and the gel content.

It is an object of the present invention to provide a novel transition-metal catalyst component which, in contrast to known catalyst components, allows the preparation of a polymer, in particular a copolymer of ethene with higher α-olefins, having an adjustable molecular weight and molecular weight distribution along with good processability, good grain quality, high resistance to environmental stress cracking, low hydrocarbon-soluble components, particularly good bubble stability on film blowing and high mechanical strength of the films and an extremely low gel content at the same time as high productivity.

We have found that this object is achieved by the transition-metal catalyst component defined at the outset, and by a process for the preparation of a homopolymer of ethene or a copolymer of ethene with minor amounts of a $C_3$- to $C_8$-αmonoolefin by polymerizing the monomers at from 30 to 200° C. and at from 0.1 to 200 bar by means of a Ziegler catalyst system comprising A) a transition-metal catalyst component and
B) an organoaluminum catalyst component of the formula $AlR_mX_{3-m}$, where
   R is a $C_1$- to $C_{18}$-hydrocarbon radical,
   m is from 1 to 3, and
   X is OR, chlorine, bromine or hydrogen, and
C) an additional catalyst component which is either an organohalogen compound or an inorganic or organic nitrogen-oxygen compound, in which the transition-metal catalyst component according to the invention is used as component (A).

The following details apply to the individual components of the system and to individual process steps:

Examples of suitable inorganic, oxidic carriers in step 1 are silica, borosilicate and aluminosilicate, aluminum phosphate and silicon-metal cogels, where the metal may be, for example, magnesium, titanium and/or zirconium. The carriers generally have a particle diameter of from 1 to 1,000 μm, preferably from 1 to 400 μm, a pore volume of from 0.3 to 3 m$^3$/g, preferably from 1 to 2.5 m$^3$/g, and a surface area of from 100 to 1,000 m$^2$/g, preferably from 200 to 400 m$^2$/g. An aluminum silicate of the formula $SiO_2 \cdot aAl_2O_3$ where a is from 0 to 2, preferably from 0 to 0.5, has proven particularly successful.

The vanadium trihalide/alcohol complex of step (1.1) has the formula $VY_3.nZ$—OH, where Y is chlorine or bromine, preferably chlorine,
n is from 1 to 6, preferably from 3 to 4, and
Z is a monovalent, saturated-aliphatic or partially saturated-aliphatic, partially aromatic hydrocarbon radical having not more than 10, preferably not more than 8, carbon atoms, in particular an alkyl radical having not more than 6 carbon atoms.

The parent vanadium trihalide here can be one which is conventional in Ziegler catalyst systems. Examples of suitable alcohol components are methanol, ethanol, 2-propanol, 2-butanol and 2-methyl-2-butanol. The complexes can be prepared from vanadium trichloride and 2-propanol in tetrahydrofuran as solvents by conventional methods, eg. by the method of D.C. Bradley, M.L. Metha, Can. J. Chem., 40 (1962), 1710/3. The complexes can be employed individually or as mixtures of a plurality of complexes.

Suitable step (1.2) components are titanium trihalides where the halogen may be chlorine and/or bromine, or titanium trihalide complexes of the formula $TiY_3.nZ$—OH, where Y is chlorine or bromine, n is from 1 to 6, and Z is a monovalent, saturated, aliphatic or araliphatic hydrocarbon radical having not more than 10 carbon atoms.

The titanium trihalide to be employed may in turn be one which is conventional in Ziegler catalyst systems, eg. the product of the reduction of a titanium tetrahalide using hydrogen, aluminum or an organoaluminum compound. For example, trichlorides of the formula $TiCl_3$, as produced in the reduction of titanium tetrachloride by means of hydrogen, and trichlorides of the formula $TiCl_3 \cdot \frac{1}{3}AlCl_3$, as produced in the reduction of titanium tetrachloride by means of metallic aluminum, have proven particularly suitable. It is also possible to employ the abovementioned titanium trihalide/alcohol complex, to which the same applies analogously as stated above for the vanadium trihalide/alcohol complex. The titanium trihalides and titanium trichloride/alcohol complexes may be used individually or as mixtures.

Preference is given to $TiCl_3$, $TiCl_3 \cdot \frac{1}{3}AlCl_3$, $TiCl_3 \cdot 4$ i-PrOH and $TiCl_3 \cdot \frac{1}{3}AlCl_3 \cdot 5$ i-PrOH.

Suitable step (1.3) components are zirconium tetrahalides, where the halogen can be chlorine and/or bromine. Suitable compounds are zirconium tetrachloride and zirconium tetrabromide.

From 0.002 to 3 mol, preferably from 0.01 to 1 mol, of the step (1.2) titanium compound and from 0.01 to 4 mol, preferably from 0.1 to 2 mol, of the step (1.3) zirconium compound are used per mol of the step (1.1) vanadium compound.

Suitable organic solvents in step (1) are saturated aliphatic or partially saturated-aliphatic, partially aromatic hydrocarbons containing 1 or 2 oxa oxygen atoms and from 3 to 19 carbon atoms, preferably saturated aliphatic or partially saturated-aliphatic, partially aromatic oxahydrocarbons containing one oxa oxygen atom and from 3 to 11 carbon atoms, in particular cyclized, saturated, aliphatic oxahydrocarbons containing one oxa oxygen atom and from 4 to 6 carbon atoms. Examples of suitable solvents are ethylene glycol dimethyl ether, anisole, tetrahydrofuran, dioxane and mixtures of these.

The step (3.1) component is an organoaluminum catalyst component of the formula $AlR_mX_{3-m}$, where R is a $C_1$- to $C_{18}$-hydrocarbon radical, preferably a $C_1$- to $C_{12}$-alkyl radical, in particular a $C_2$- to $C_8$-alkyl radical, m is from 1 to 3, preferably from 2 to 3, in particular 2, and X is OR, chlorine, bromine or hydrogen, preferably OR or chlorine, in particular chlorine.

Examples of suitable organoaluminum compounds are $Al(C_2H_5)_3$, $Al(C_2H_5)_2Cl$, $Al(C_2H_5)_2Br$, $Al(C_2H_5)_{1.5}Cl_{1.5}$, $Al(C_2H_5)_{1.5}Br_{1.5}$, $Al(C_2H_5)Cl_2$, $Al(C_2H_5)Br_2$, $Al(C_4H_9)_3$, $Al(C_4H_9)_2Cl$, $Al(C_4H_9)Cl_2$, $Al(C_2H_5)_2H$, $Al(C_4H_9)_2H$, $Al(C_3H_7)_2(OC_3H_7)$ or $Al(C_2H_5)_{1.5}(OC_2H_5)_{1.5}$, isoprenylaluminum and mixtures thereof. Particularly suitable aluminum compounds are those of the formula $C_2H_5AlCl_2$ or $(C_2H_5)_2AlCl$ and isoprenylaluminum.

The step (1.1), (1.2), (1.3) and (3.1) components are employed in mixing ratios which give an atomic ratio between the sum of the transition metals titanium, vanadium and zirconium of the solid-phase intermediate in step (2) and aluminum of the organoaluminum component in step (3.1) of from 1:0.5 to 1:30, preferably from 1:0.1 to 1:5.

Suitable organic carboxylates or organic silicon compounds of step (3.2) are compounds of the following formula:

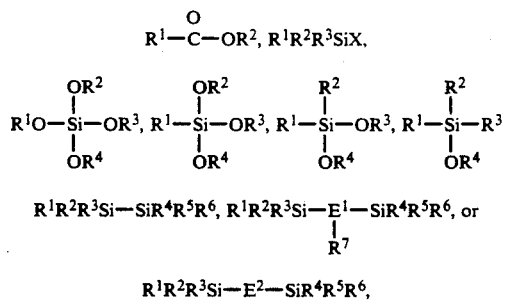

where $R^1$ to $R^6$ are an aliphatic, aromatic or araliphatic $C_1$- to $C_{12}$-hydrocarbon radical, preferably aliphatic, aromatic or araliphatic $C_1$- to $C_{12}$-alkyl, in particular $C_2$- to $C_9$-alkyl, phenyl or phenyl($2-$ to $C_8$-)alkyl, $R^7$ is hydrogen or a $C_1$–$C_{12}$-hydrocarbon radical, preferably hydrogen or $C_1$–$C_{12}$-alkyl, in particular hydrogen, X is bromine, chlorine or an unsaturated $C_2$- to $C_{18}$-hydrocarbon radical, preferably bromine, chlorine or unsaturated $C_2$- to $C_{12}$-alkenyl, in particular chlorine or $C_2$- to $C_8$-alkenyl, $E^1$ is an element of main group V, preferably nitrogen, phosphorus or arsenic, in particular nitrogen, $E^2$ is an element of main group VI, preferably sulfur or oxygen, in particular oxygen.

Examples of suitable organic carboxylates are methyl, ethyl, propyl, butyl, pentyl or phenyl esters of acetic acid, benzoic acid, phenylacetic acid and derivatives thereof which are substituted on the aromatic ring by alkyl. Preference is given to phenyl, benzyl, t-butyl and neopentyl esters of acetic acid, benzoic acid and phenylacetic acid.

Examples of suitable silicon compounds are trimethyl-, triethyl-, tripropyl-, tributyl-, tripentyl-, trihexyl- and triphenylchlorosilane and their analogs which are substituted by different substituents, tetramethoxy-, tetraethoxy-, tetrapropoxy- and tetrabutoxy-silane, methyl-, ethyl-, propyl- and i-butyltrimethoxy-silane, -triethoxysilane, -tripropoxysilane and -tributoxysilane, dimethyl-, diethyl-, dipropyl- and dibutyl-dimethoxysilane, -diethoxysilane, -dipropoxysilane and -dibutoxysilane, trimethyl-, triethyl-, tripropyl- and tributylmethoxysilane, -ethoxysilane, -propoxysilane and -butoxysilane, hexamethyl-, hexaethyl- and hexapropyldisilane, hexamethyl-, hexaethyl- and hexapropyldisilazane, and hexamethyl-, hexaethyl- and hexapropyldisiloxane. Preference is given to tributyl-, tripentyl-, trihexyl- and triphenylchlorosilane, tetrapropoxy- and tetrabutoxysilane, i-propyl- and i-butyltri-methoxysilane and -triethoxysilane, di-i-propyl- and di-i-butyldimethoxysilane and -diethoxysilane, trimethyl-and triethyl-i-propoxysilane and -i-butoxysilane, hexamethyldisilane, hexamethyldisilazane and hexamethyldisiloxane.

The solvent in step (3.2) is an organic solvent which is inert to the step (3) component. Examples of suitable solvents are hydrocarbons, such as hexane, heptane, petroleum ethers or saturated hydrocarbons which are liquid at room temperature. Preference is given to pentane, hexane and heptane.

To prepare the mixture in step (1), the vanadium, titanium and zirconium components in steps (1.1), (1.2) and (1.3) are dissolved in one of the abovementioned solvents or solvent mixtures, and the inorganic, oxidic carrier is added which stirring, either as the solid or suspended in one of the abovementioned solvents or solvent mixtures, and the mixture is stirred for a further 15 to 200 minutes at room temperature.

The weight ratio between the inorganic, oxidic carrier and the sum of the vanadium, titanium and zirconium components in steps (1.1), (1.2) and (1.3) is from 10:1 to 1:3, preferably from 5:1 to 1:2.

In step (2), the solvent or solvent mixture is evaporated until the intermediate has a dry consistency. This can be carried out at elevated temperature and under reduced pressure. The dry intermediate may still contain a complexed solvent.

To prepare the mixture in step (3), a 0.1 to 50% strength by weight, preferably about 25% strength by weight, suspension of the solid-phase intermediate (2) and a 5 ti 80% strength by weight, preferably about 20% strength by weight, solution of the aluminum component (3.1) are preferably prepared in separate batches in hexane, heptane, petroleum ethers or mixtures thereof. The suspension and solution are then combined with stirring in such mixing ratios that the desired weight ratio is achieved. The organic carboxylate or the organic silicon compound or a mixture thereof in step (3.2) is added to this suspension with continued stirring. However, this step (3.2) component can also be added to the solution of the aluminum component (3.1) and subsequently added to the suspension of the solid-phase intermediate (3). The suspension is stirred for from 15 to 600 minutes, preferably from 6 to 300 minutes, at from $-25$ to $120°$ C., preferably from 25 to $80°$ C., completing the formation of the transition-metal catalyst component, which is in the form of a suspension. This can be used directly in the form of the resultant suspension as the transition-metal catalyst component (A). If desired, the solid-phase product (3) can be isolated and then employed as the transition-metal catalyst component (A). To this end, it is separated from the liquid phase by filtration, washed with pure solvent and dried, for example under reduced pressure.

The Ziegler catalyst system for the homopolymerization or copolymerization of ethene comprises
A) the transition-metal catalyst component according to the invention,
B) an organoaluminum catalyst component of the formula $AlR_mX_{3-m}$, where
R is a $C_1$- to $C_{18}$-hydrocarbon radical,
m is from 1 to 3, and
X is OR, chlorine, bromine or hydrogen, and
C) an additional catalyst component which is either an organohalogen compound or an inorganic or organic nitrogen-oxygen compound.

Suitable compounds for component (B) are those mentioned in step (3.1) under tri-i-butylaluminum. Triethylaluminum and tri-i-butylaluminum have proven particularly successful. Suitable compounds for the organohalogen catalyst component (C) are saturated aliphatic hydrocarbons, olefinically unsaturated aliphatic halogenated hydrocarbons, acetylenically unsaturated aliphatic halogenated hydrocarbons, aromatic halogenated hydrocarbons and olefinically unsaturated aliphatic halogenated carboxylates, nitrogen oxides, nitroso and nitro compounds and nitrites and nitrates, such as NO, $NO_2$, $N_2O$, nitrosodiphenylamine, nitrobenzene, nitromethane, i-butyl nitrite, i-amyl nitrite and i-propyl nitrate, as mentioned, for example, in EP-B 166 888, U.S. Pat. No. 3,462,399 and German Laid-Open Application DOS 1 545 111. Preference is given to chloroform, 1,1,1-trichloroethane and Frigen-11.

Suitable polymerization processes are those of the prior art, such as suspension polymerization or dry-phase polymerization in a stirred or fluidized fixed bed, as described, for example, in U.S. Pat. No. 3,242,150, DE 32 39 883 and EP 0 004 645. In these processes, the transition-metal catalyst component (A) according to the invention can be introduced into the polymerization reactor in various ways. Thus, the transition-metal catalyst component (A), the organoaluminum component (B) and the additional catalyst component (C) can be introduced into the polymerization reactor 1. all at the same location,
2. the same 3 components at separate locations,
3. the transition-metal component (A) at one location and a mixture of (B) and (C) at a separate location, or
4. a mixture of the transition-metal component (A) and the additional catalyst component (C) at one location and the organoaluminum component (B) at a separate location.

The polymerization process, which is preferably carried out continuously, is suitable for the preparation of a homopolymer of ethene, but preferably a copolymer of ethene with minor amounts of a $C_3$- to $C_8$-, in particular a $C_4$- to $C_8$-$\alpha$-monoolefin, it being possible for the latter to be in the form of individual compounds or mixtures of two or more monomers. Examples of $\alpha$-monoolefins which are suitable for the copolymerization are propane, 1-n-butene, 4-methyl-1-pentene, 1-n-hexene, 1-n-heptene and 1-n-octene, preference being given to 1-n-butene, 1-n-hexene and 4-methyl-1-pentene or a mixture thereof. In general, from 0.1 to 10 mol%, based on the copolymer, of the higher $\alpha$-monoolefin(s) are copolymerized.

EXAMPLES 1 TO 5

Preparation of the transition-metal catalyst component (A)

Steps (1) and (2)

25 g of silica having a particle diameter of from 20 to 60 $\mu$m, a pore volume of 1.75 cm$^3$/g, and a surface area of 340 m$^2$/g, and a solution of 27.6 g of a vanadium trihalide/alcohol complex of the formula $VCl_3 \cdot 4$ ZOH, where Z is isopropyl, 1.4 g of a titanium trihalide/aluminum trihalide of the formula $TiCl_3 \cdot \frac{1}{3} AlCl_3$ and 1.6 g of zirconium tetrachloride in 100 g of tetrahydrofuran were combined, and the resultant suspension was stirred briefly. The solid-phase intermediate (2) formed was subsequently isolated by evaporating the volatile constituents in a rotary evaporator at 10 mbar and $70°$ C.

Steps (3) and (4)

20 g of the solid-phase intermediate obtained in step (2) were suspended in 75 g of n-heptane. A solution of 7.4 g of diethylaluminum chloride (DEAC) and one of the compounds (3.2) listed in the table in the molar ratio 1:1 (DEAC:compounds) in 50 g of n-heptane was added, and the resultant suspension was stirred at $65°$ C. for 120 minutes and filtered, and the product was washed three times with n-heptane and dried under reduced pressure. Analysis of the solid-phase product (4), ie. the catalyst component (A), gave a transition-metal content of 0.0016 mol/g.

COMPARATIVE EXAMPLE

Steps (1) and (2) are carried out by a method similar to that of Examples 1 to 5.

Steps (3) and (4)

20 g of the solid-phase intermediate obtained in step (2) were suspended in 75 g of n-heptane. A solution of 7.4 g of diethylaluminum chloride (DEAC) in 50 g of n-heptane was added, and the resultant suspension was stirred at 65° C. for 120 minutes and filtered, and the product was washed three times with n-heptane and dried under reduced pressure. Anaylsis of the solid-phase product (4), ie. the catalyst component (A), gave a transition-metal content of 0.0016 mol/g.

Polymerization

A 10 liter autoclave was charged with 5 l of i-butane, 0.27 of 1-buitane, 8 l (s.t.p.) of hydrogen, 200 mg of catalyst component (A), 5 mmol of tri-i-butylaluminum as catalyst component (B) and 2 mmol of trichlorofluoromethane as the organohalogen catalyst component (C). The mixture was then polymerized for 90 minutes at 80° C. with stirring and at an ethene partial pressure kept constant at 16.5 bar regulation. The polymerization was then terminated by decompression.

TABLE

| Example No. | Component (3.2) | 1) P/C g PE/g Cat. | 2) MFI g/10' | 3) Density g/cm$^3$ | 4) x.s. % | 5) DDI g |
|---|---|---|---|---|---|---|
| 1 | Ethyl benzoate | 5970 | 2.9 | 0.948 | 2.4 | 390 |
| 2 | Tetraethoxysilane | 7040 | 3.9 | 0.948 | 2.3 | 360 |
| 3 | Trihexylchlorosilane | 7110 | 4.0 | 0.947 | 3.4 | 380 |
| 4 | Hexamethyldisilane | 7380 | 3.6 | 0.947 | 3.1 | 420 |
| 5 | Hexamethyldisiloxane | 7540 | 3.1 | 0.946 | 2.5 | 400 |
| Comparative Example | — | 6900 | 3.8 | 0.949 | 6.3 | 250 |

1) P/C = catalyst productivity in g of PE/g of catalyst
2) determined in accordance with DIN 53 735, 190° C. at a load of 2.16 kg
3) determined in accordance with DIN 53 479
4) x.s. = xylene-soluble components
The xylene-soluble component of the products prepared here is the part which remains dissolved after a polymer solution in xylene which is clear at the boiling point is cooled to 20° C. The concentration is adjusted to 1% strength.
5) DDI (dart drop impact) ASTM 1709, determined on films of thickness 20 μm

We claim:

1. A transition-metal catalyst component for a Ziegler catalyst system, obtained by
   1) mixing, in a solvent, an inorganic, oxidic carrier with
      1.1) a vanadium trihalide/alcohol complex of the formula VY$_3$nZ—OH, where
         Y is chlorine or bromine,
         n is from 1 to 6, and
         Z is a monovalent, saturated, aliphatic or aralphatic hydrocarbon radical having not more than 10 carbon atoms, and
      1.2) a titanium trihalide or a titanium trihalide/aluminum trihalide complex, where the halogen can be chlorine and/or bromine, or a titanium trihalide complex of the formula TiY$_3$.nZ—OH or a mixture thereof, where
         Y is chlorine or bromine,
         n is from 1 to 6, and
         Z is a monovalent, saturated, aliphatic or aralphatic hydrocarbon radical having not more than 10 carbon atoms or a mixture thereof, and
      1.3) a zirconium tetrahalide, where the halogen can be chlorine and/or bromine,
   2) removing the solvent by evaporation,
   3) mixing the solid-phase intermediate from step (2) with
      3.1) an organoaluminum catalyst component of the formula AlR$_m$X$_{3-m}$, where
         R is a C$_1$- to C$_{18}$-hydrocarbon radical,
         m is from 1 to 3, and
         X is OR, chlorine, bromine or hydrogen, and
      3.2) an organic carboxylate or an organosilicon compound or a mixture thereof in an organic solvent, and
   4) isolating the solid-phase intermediate by filtration, washing and drying.

2. A transition-metal catalyst component as defined in claim 1, obtained using a silica- or silica/alumina-based based carrier in step (1).

3. A transition-metal catalyst component as defined in claim 1, obtained using from 0.002 to 3 mol of a titanium compound in step (1.2) and from 0.01 to 4 mol of the zirconium compound in step (1.3) per mol of a vanadium compound in step (1.1).

4. A transition-metal catalyst component as defined in claim 1, obtained observing an atomic ratio between the sum of the transition metals titanium, vanadium and zirconium of the solid-phase intermediate in step (2) and aluminum of the organoaluminum component in step (3.1) of from 1:0.05 to 1:30.

5. A transition-metal catalyst component as defined in claim 1, obtained using an organic carboxylate of the formula

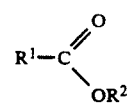

where R$^1$ and R$^2$ are a C$_1$-C$_{18}$-hydrocarbon radical, as component (3.2).

6. A transition-metal catalyst component as defined in claim 1, obtained using an organosilicon compound of the formula

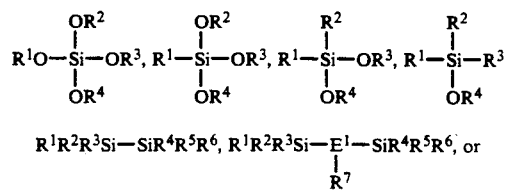

where
- $R^1$ to $R^6$ are a $C_1$- to $C_{18}$-hydrocarbon radical,
- $R^7$ is hydrogen or a $C_1$-$C_{12}$-hydrocarbon radical,
- X is halogen or an unsaturated $C_2$- to $C_{18}$-hydrocarbon radical,
- $E^1$ is an element from main group V, and
- $E^2$ is an element from main group VI.

7. A transition-metal catalyst component as defined in claim 1 or 2 or 3 or 5 or 5 or 6, obtained using from 20 to 80 mol-% of the step (3.1) component and from 20 to 80 mol-% of the step (3.2) component, with the proviso that the sum is 100 mol-%.

8. A transition-metal catalyst component as defined in claim 2, obtained using as component (3.2) an organic carboxylate of the formula

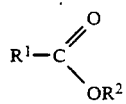

where $R^1$ and $R^3$ are each a $C_1$-$C_{18}$-hydrocarbon radical.

9. A transition-metal catalyst component as defined in claim 5 obtained using as component (3.2) an organosilicon compound of the formula

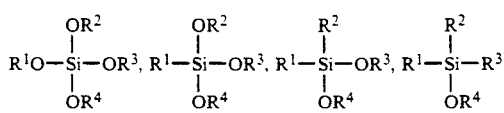

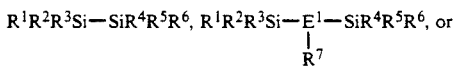

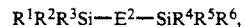

where
- $R^1$ to $R^7$ are a $C_1$- to $C_{18}$-hydrocarbon radical,
- $R^7$ is hydrogen or a $C_1$-$C_{18}$-hydrocarbon radical,
- X is halogen or an unsaturated $C_2$- to $C_{18}$-hydrocarbon radical,
- $E^1$ is an element from main group V, and
- $E^2$ is an element from main group VI.

10. A transition-metal catalyst component as defined in claim 6 obtained using from 20 to 80 mol-% of component (3.1) and from 20 to 80 mol-% of component (3.2) with the proviso that the sum is 100 mol-%.

* * * * *

UNITED STATES PATENT AND TRADEMARK OFFICE
CERTIFICATE OF CORRECTION

PATENT NO. : 5,143,882
DATED : September 1, 1992
INVENTOR(S) : BUESCHGES et al.

It is certified that error appears in the above-identified patent and that said Letters Patent is hereby corrected as shown below:

Claim 6, Col. 9, Line 2

"tO" should read --to--.

Claim 8, Col. 9, Line 25

"$R^3$" should read --$R^2$--.

Claim 9, Col. 10, Line 16

"$R^7$" should read --$R^6$--.

Signed and Sealed this

Ninth Day of November, 1993

Attest:

BRUCE LEHMAN

Attesting Officer    Commissioner of Patents and Trademarks